(12) United States Patent
Weitzel

(10) Patent No.: US 6,632,869 B2
(45) Date of Patent: Oct. 14, 2003

(54) PROCESS FOR PREPARING POLYMER DISPERSIONS WITH A HIGH SOLIDS CONTENT

(75) Inventor: Hans-Peter Weitzel, Reischach (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 59 days.

(21) Appl. No.: 09/906,421

(22) Filed: Jul. 16, 2001

(65) Prior Publication Data

US 2002/0032268 A1 Mar. 14, 2002

(30) Foreign Application Priority Data

Jul. 21, 2000 (DE) .......................... 100 35 589

(51) Int. Cl.$^7$ .............................. C08L 19/02
(52) U.S. Cl. ................. 524/459; 524/503; 524/458; 524/461; 524/765; 524/800; 524/803; 526/202; 526/203; 526/219.5; 525/56; 525/57
(58) Field of Search ................. 524/459, 503, 524/458, 461, 765, 800, 803; 526/202, 203, 219.5; 525/56, 57

(56) References Cited

U.S. PATENT DOCUMENTS

| | | | |
|---|---|---|---|
| 3,827,996 A | | 8/1974 | Beresniewicz |
| 4,539,361 A | * | 9/1985 | Siol et al. .................... 524/458 |
| 5,340,859 A | | 8/1994 | Aydin et al. |
| 5,426,146 A | | 6/1995 | Aydin et al. |
| 5,430,092 A | | 7/1995 | Aydin et al. |
| 5,633,334 A | | 5/1997 | Walker et al. |
| 5,936,020 A | | 8/1999 | Freidzon |
| 6,001,916 A | * | 12/1999 | Walker et al. ............... 524/459 |
| 6,028,135 A | | 2/2000 | Keller et al. |
| 6,093,766 A | * | 7/2000 | Jakob et al. ................. 524/461 |
| 6,300,403 B1 | * | 10/2001 | Mayer et al. ................ 524/459 |
| 6,331,587 B1 | * | 12/2001 | Geissler ....................... 524/459 |

FOREIGN PATENT DOCUMENTS

| | | |
|---|---|---|
| DE | 32 27 090 A1 | 1/1984 |
| DE | 4213968 | 11/1993 |
| DE | 19642762 | 4/1998 |
| DE | 19645427 | 5/1998 |
| EP | 0614922 | 9/1994 |
| EP | 0814096 | 12/1997 |
| EP | 0814103 | 12/1997 |
| EP | 0 889 068 A2 | 1/1999 |
| EP | 0889068 | 1/1999 |
| EP | 0785970 | 4/1999 |
| EP | 0 924 229 A1 | 6/1999 |
| EP | 0928798 | 7/1999 |

OTHER PUBLICATIONS

Derwent Abstract corresponding to DE 19642762 (AN 1998–241475).
Derwent Abstract corresponding to DE 19645427 (AN 1998–262397).
Fox T.G., Bull. Am. Physics Soc. 1, 3, p. 123 (1956).
The Polymer Handbook, 2nd Edition, J. Wiley & Sons, New York (1975).
WP1 1999, Ref. 29132/03 (Corresponds to JP–A 10–292081).
Derwent Abstract Corresponding To JP–A 10–292081 [AN 1999–029132].
"Hochmolekularbericht" 1983, Ref. H. 3405/83 Corresponding To JP 56–135575.
Derwent Abstract Corresponding to DE–A 32 27 090 [AN 1984–024465].
Derwent Abstract Corresponding To JP 56–135575 [AN 1981–899100].

* cited by examiner

Primary Examiner—David W. Wu
Assistant Examiner—Satya Sastri
(74) Attorney, Agent, or Firm—Brooks Kushman P.C.

(57) ABSTRACT

A process for preparing copolymers based on vinyl esters and ethylene and, if desired, further comonomers in the form of their aqueous dispersions, having a solids content of greater than 65% and a Brookfield viscosity (20 s$^{-1}$) of less than 10,000 mPa·s, by means of free-radically initiated polymerization of one or more monomers selected from vinyl esters and ethylene and, if desired, further monomers copolymerizable therewith, in the presence of one or more protective colloids, polymerization being conducted in the presence of from 2 to 15% by weight of seed latex, based on the amount of vinyl ester, said process comprising a) polymerizing without adding emulsifier, and in the presence of one or more polyvinyl alcohols protective colloids having a degree of hydrolysis of from 80 to 95 mol % and a Höppler viscosity in 4% strength aqueous solution of from 3 to 30 mPa·s, and b) introducing the seed latex in a fraction of from 30 to 75% by weight before beginning the polymerization and metering in the remainder during the polymerization, the seed latex having an average particle size (weight average Dw) of from 200 to 2000 nm.

10 Claims, No Drawings

PROCESS FOR PREPARING POLYMER DISPERSIONS WITH A HIGH SOLIDS CONTENT

BACKGROUND OF THE INVENTION

1. Field of the Invention

The invention relates to a process for preparing aqueous polymer dispersions based on vinyl esters, ethylene and optionally further comonomers, the polymer dispersions having a solids content of greater than 65% and a viscosity less than 10,000 mPa·s, and to the use thereof.

2. Background Art

Protective-colloid-stabilized polymers are employed, particularly in the form of their aqueous dispersions or in the form of water-redispersible polymer powders, in a variety of applications. Examples include coating compositions and adhesives for a very wide variety of substrates, for example as cementitious tile adhesives, as wood glue, or as flooring adhesives. Many varieties of polyvinyl alcohols are used as protective colloids. Polyvinyl alcohols are desirable as protective colloids, because they contribute to the strength of the end product, for example improved tensile bonding strength in tile adhesives as compared to systems stabilized by low molecular weight compounds (emulsifiers). Furthermore, it is desirable from an environmental standpoint to forego the use of low molecular weight surfactants, especially alkylphenol ethoxylates, and to carry out stabilization using protective colloids exclusively.

A high solids content in such polymer dispersions is desirable for a number of reasons. High solids content affords logistical advantages, since less water has to be transported, as well as technical advantages, such as more rapid drying of the adhesives. Numerous patents disclose the preparation of high solids dispersions. The standard approach involves producing a bimodal or polymodal particle size distribution using specific polymerization techniques. The products are stabilized predominantly by emulsifiers, or by both emulsifier and polyvinyl alcohol. Emulsifier-free dispersions with a high solids content have not been available to date.

U.S. Pat. No. 5,426,146 provides a process for preparing high solids dispersions by initiating polymerization in the presence of a seed latex consisting of a mixture of two or more dispersions containing relatively small particles having a size of from 20 to 100 nm. This process yields dispersions with a specific particle size distribution, which creates better flow properties. The process in question is relatively complex, with specific conditions to be observed with regard to the bulk density, the specific volume, and the particle diameter.

EP-A 614922 (U.S. Pat. No. 5,430,092) describes a process for preparing aqueous polymer dispersions with high solids content and good flow properties in the presence of a seed latex having a particle size of from 90 nm to 500 nm. The seed latex which must be included in its entirety in the initial charge. The polymerization takes place in a multistage feed process in which a defined portion of the monomers is polymerized initially and then a specific polymer conversion must be attained. Again, the highly complex procedure is disadvantageous.

DE-A 4213968 (U.S. Pat. No. 5,340,859) describes a procedure for preparing high solids dispersions in the presence of two seed latices, of which one contains both large (greater than 300 nm) and relatively small (less than 50 nm) particles and is metered in gradually, whereas the second seed latex is included in its entirety in the initial charge. Additionally, there are certain parameters which must be observed with regard to conversion and molar number of the seed latex particles. Here again, the highly complex procedure is disadvantageous.

EP-A 814103 (U.S. Pat. No. 6,028,135) relates to a procedure for preparing aqueous polymer dispersions of high solids content that is intended to avoid the formation of gel specks, in particular those produced during polymerization. This improvement is realized by preemulsifying the majority of the polymerizable monomers into a seed latex, which is then metered into the polymerization.

DE-A 19642762 relates to a process for preparing polymer dispersions of high solids content, where, to avoid the formation of gel specks, functional comonomers are copolymerized, and during the polymerization, the pH is altered. Polymerization first takes place at pH conditions under which the functional groups are in neutralized form, the pH then being changed such that the functional groups are converted into charged groups.

DE-A 19645427 also relates to a process for preparing polymer dispersions with high solids content where polymerization is conducted in the presence of functional comonomers, but utilizes a two-stage feed technique in which, in the first stage, the feed rate is continuously increased, and in the second stage polymerization is carried out at constant feed rate. No seed latex is used in the process.

EP-A 889068 describes a process for preparing vinyl acetate-ethylene dispersions of high solids content, where some of the vinyl acetate is included in the initial charge and some is metered in, the polymerization being conducted in the presence of a mixture of polyvinyl alcohol and nonionic emulsifier.

EP-A 814096 (U.S. Pat. No. 6,028,135) describes a process for preparing dispersions having a solids content of at least 70%. In order to avoid microcoagulum, a water-miscible organic solvent is used during the emulsion polymerization. Stabilization is carried out using an emulsifier.

EP-A 785970 describes dispersions having a solids content of at least 77%. The particle size distribution is at least bimodal. Polymerization takes place in the presence of a seed latex which is introduced in the initial charge. Stabilization is again carried out with emulsifier and, if desired, also with polyvinyl alcohol.

U.S. Pat. No. 6,001,916 describes a process for preparing vinyl acetate-ethylene dispersions having a solids content of at least 65%. The polymerization is preferably carried out with the use of polyvinyl alcohol in combination with a nonionic emulsifier as dispersant. In the procedure described therein, all of the seed latex is included in the initial charge.

In U.S. Pat. No. 5,936,020 a process is described for preparing vinyl acetate-ethylene copolymer dispersions having a solids content of at least 65%. The polymerization takes place in the presence of a dispersant combination comprising polyvinyl alcohol, nonionic emulsifier, and the salt of a polyacid.

EP-A 928798 relates to the preparation of aqueous dispersions of vinyl acetate-ethylene copolymers having a solids content of at least 65%. The dispersions are stabilized by means of a specific emulsifier system comprising polyvinyl alcohol and nonionic emulsifier.

SUMMARY OF THE INVENTION

It was an object of the invention to provide a stable polymer dispersion based on vinyl esters, ethylene and, if desired, further comonomers the dispersion having a solids content of greater than 65% and a Brookfield viscosity less than 10000 mPa·s, stabilized by means of polyvinyl alcohol.

DETAILED DESCRIPTION OF THE PREFERRED EMBODIMENT(S)

The invention provides a process for preparing copolymers based on vinyl ester and ethylene, and optionally further comonomers, in the form of aqueous dispersions having a solids content greater than 65% and a Brookfield (20 s$^{-1}$) viscosity of less than 10,000 mPa·s by means of free-radical initiated polymerization of one or more vinyl ester monomers and ethylene, and optionally further copolymerizable monomers, in the presence of one or more protective colloids, polymerization being conducted in the presence of from 2 to 15% by weight of seed latex, based on the amount of vinyl ester, by:

a) polymerizing the comonomers, without adding emulsifier, and in the presence of one or more polyvinyl alcohol protective colloids, the polyvinyl alcohols having a degree of hydrolysis of from 80 to 95 mol % and a Höppler viscosity in 4% by weight aqueous solution of from 3 to 30 mPa·s, and b) introducing the seed latex in a fraction of from 30 to 75% by weight before beginning the polymerization and metering in the remainder during the polymerization, the seed latex having an average particle size (weight average Dw) of from 200 to 2000 nm.

Suitable vinyl esters are those of carboxylic acids having 1 to 12 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 carbon atoms, examples being VeoVa9® or VeoVa10® (trade names of Shell). Vinyl acetate is particularly preferred. The vinyl esters are generally copolymerized in amounts of from 30 to 90% by weight, based on the overall weight of the monomers.

Ethylene is generally copolymerized in an amount of from 1 to 40% by weight based on the overall weight of the monomers.

Suitable further comonomers include esters of acrylic acid or methacrylic acid, vinyl halides such as vinyl chloride, and olefins such as propylene. Suitable methacrylic or acrylic esters are esters of unbranched or branched alcohols having 1 to 15 carbon atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate, and 2-ethylhexyl acrylate. These comonomers may be copolymerized in amounts of from 1 to 40% by weight based on the overall weight of the monomers.

If desired it is possible to copolymerize from 0.05 to 10% by weight, based on the overall weight of the monomer mixture, of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric and maleic acids such as the diethyl and diisopropyl esters; maleic anhydride; and ethylenically unsaturated sulfonic acids and their salts, preferably vinylsulfonic acid and 2-acrylamido-2-methylpropanesulfonic acid. Further examples are precrosslinking comonomers such as polyethylenically unsaturated comonomers, examples being divinyl adipate, diallyl maleate, allyl methacrylate, and triallyl cyanurate, or post-crosslinking comonomers, examples being acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylacrylamide, of N-methylolmethacrylamide and of N-methylolallylcarbamate. Also suitable are epoxy-functional comonomers such as glycidyl methacrylate and glycidyl acrylate. Further examples are silicon-functional comonomers, such as acryloxypropyltri(alkoxy)silanes and methacryloxypropyltri(alkoxy)silanes, vinyl trialkoxysilanes, and vinylmethyldialkoxysilanes, examples of alkoxy groups present being methoxy and ethoxy radicals and ethoxypropylene glycol ether radicals. Mention may also be made of monomers containing hydroxyl or CO groups, examples being methacrylic and acrylic acid hydroxyalkyl esters such as hydroxyethyl, hydroxypropyl and hydroxybutyl acrylates or methacrylates and compounds such as diacetoneacrylamide and acetylacetoxyethyl acrylates or methacrylates.

Preference is given to comonomer mixtures of vinyl acetate with from 1 to 40% by weight of ethylene; comonomer mixtures of vinyl acetate with from 1 to 40% by weight of ethylene and from 1 to 50% by weight of one or more further vinyl ester comonomers having 1 to 12 carbon atoms in the carboxylic acid radical such as vinyl propionate, vinyl laurate, vinyl esters of α-branched carboxylic acids having 9 to 11 carbon atoms such as VeoVa9, VeoVa10, VeoVa11; mixtures of vinyl acetate, from 1 to 40% by weight of ethylene, and preferably from 1 to 60% by weight of acrylic esters of branched or unbranched alcohols having from 1 to 15 carbon atoms, especially n-butyl acrylate or 2-ethylhexyl acrylate; mixtures of from 30 to 75% by weight of vinyl acetate, from 1 to 30% by weight of vinyl laurate or vinyl esters of an α-branched carboxylic acid having 9 to 11 carbon atoms, and from 1 to 30% by weight of acrylic esters of branched or unbranched alcohols having 1 to 15 carbon atoms, especially n-butyl acrylate or 2-ethylhexyl acrylate, which also contain from 1 to 40% by weight of ethylene; and mixtures of vinyl acetate, from 1 to 40% by weight of ethylene, and from 1 to 30% by weight of vinyl chloride; where such mixtures may further contain the abovementioned auxiliary monomers in the stated amounts, and the weight percentages of all monomers add up to 100% for each polymer.

The monomer selection and the selection of the weight fractions of the comonomers are made such as to give, in general, a glass transition temperature Tg of from −50° C. to +50° C. The glass transition temperature Tg of the polymers may be determined in a known manner by means of differential scanning calorimetry (DSC). The Tg may also be calculated approximately in advance by means of the Fox equation. According to T. G. Fox, BULL. AM. PHYSICS SOC. 1,3, page 123 (1956): $1/Tg = x_1/Tg_1 + x_2/Tg_2 + \ldots + x_n/Tg_n$, where $X_n$ is the mass fraction (% by weight/100) of monomer n, and $Tg_n$ is the glass transition temperature, in degrees kelvin, of the homopolymer of the monomer n. Tg values for homopolymers are listed in the POLYMER HANDBOOK, 2nd Edition, J. Wiley & Sons, New York (1975).

Polymer preparation takes place by the emulsion or suspension polymerization processes, preferably by emulsion polymerization, the polymerization temperature being generally from 40° C. to 100° C., preferably from 60° C. to 90° C. The pressure generally reaches 5 to 100 bar. The polymerization is initiated with water-soluble or monomer-soluble initiators or redox initiator combinations that are customary for emulsion and suspension polymerization, respectively. Examples of suitable water-soluble initiators are the sodium, potassium and ammonium salts of peroxydisulfuric acid, hydrogen peroxide, t-butyl peroxide, t-butyl hydroperoxide, potassium peroxydiphosphate, tert-butyl peroxypivalate, cumene hydroperoxide, isopropylbenzene monohydroperoxide, and azobisisobutyronitrile. The sodium, potassium and ammonium salts of peroxydisulfuric acid and hydrogen peroxide are preferred. Suitable monomer-soluble initiators are dicetyl peroxydicarbonate, dicyclohexyl peroxydicarbonate, and dibenzoyl peroxide. The initiators are generally used in an amount of from 0.01 to 0.5% by weight, based on the overall weight of the monomers.

Suitable redox initiators are combinations of the abovementioned initiators with reducing agents. Suitable reducing agents are the sulfites and bisulfites of alkali metals and ammonium, an example being sodium sulfite; the derivatives of sulfoxylic acid such as zinc or alkali metal formaldehyde-sulfoxylates, for example, sodium hydroxymethanesulfonate (Brüggolit); and (iso)ascorbic acid. Sodium hydroxymethanesulfonate and (iso)ascorbic acid are preferred. The amount of reducing agent is preferably from 0.01 to 0.5% by weight based on the overall weight of the monomers.

In order to control the molecular weight it is possible to use regulating substances (i.e., chain transfer agents) during the polymerization. Regulators are normally used in amounts of from 0.01 to 5.0% by weight based on the monomers to be polymerized, and are metered in separately or as a premix with reaction components. Examples of such substances are n-dodecyl mercaptan, tert-dodecyl mercaptan, mercaptopropionic acid, methyl mercaptopropionate, isopropanol, and acetaldehyde. Preferably, no regulating substances are used.

Suitable protective colloids are partially saponified polyvinyl alcohols having a degree of hydrolysis of from 80 to 95 mol % and a Höppler viscosity in 4% by weight aqueous solution of from 3 to 30 mPa·s (Höppler method at 20° C., DIN 53015). Also suitable are partially saponified, hydrophobically modified polyvinyl alcohols having a degree of hydrolysis of from 80 to 95 mol % and a Höppler viscosity in 4% by weight aqueous solution of from 3 to 30 mPa·s. Examples of these are partially saponified copolymers of vinyl acetate with hydrophobic comonomers such as isopropenyl acetate, vinyl pivalate, vinyl ethylhexanoate, vinyl esters of saturated, α-branched monocarboxylic acids having 5 or 9 to 11 carbon atoms; dialkyl maleates and fumarates such as diisopropyl maleate and diisopropyl fumarate; vinyl chloride; vinyl alkyl ethers such as vinyl butyl ether; and olefins such as ethene and decene. The fraction of hydrophobic units is preferably from 0.1 to 10% by weight based on the overall weight of the partially saponified polyvinyl alcohols. It is also possible to use mixtures of the abovementioned polyvinyl alcohols.

Further preferred polyvinyl alcohols are partially saponified, hydrophobicized polyvinyl alcohols obtained by a polymer-analogous reaction, an example being acetalization of the vinyl alcohol units with $C_1$ to $C_4$ aldehydes such as butyraldehyde. The fraction of the hydrophobic units is preferably from 0.1 to 10% by weight, based on the overall weight of the partially saponified polyvinyl acetate. The preferred degree of hydrolysis is from 80 to 95 mol %, more preferably from 85 to 94 mol %, the Höppler viscosity (DIN 53015, Höppler method, 4% by weight aqueous solution) is preferably from 3 to 30 mPa·s, more preferably from 2 to 25 mPa·s.

Maximum preference is given to polyvinyl alcohols having a degree of hydrolysis of from 85 to 94 mol % and a Höppler viscosity, in 4% by weight aqueous solution, of from 3 to 15 mPa·s (Höppler method at 20° C., DIN 53015). The protective colloids are attainable by means of processes known to the skilled worker. The polyvinyl alcohols are generally used in the polymerization in amounts of from 1 to 20% by weight based on the overall weight of the monomers. In the process of the invention, polymerization is carried out without the addition of emulsifiers. The protective colloid fraction may either be included completely in the initial charge or else partly included in the initial charge and partly metered in. It is preferred to include at least 2% by weight of the protective colloid in the initial charge; most preferably, the protective colloid fraction is included completely in the initial charge.

The monomers may be included in their entirety in the initial charge, metered in in their entirety, or included partly in the initial charge, with the remainder metered in after the polymerization has been initiated. A preferred procedure is to include from 20 to 50% by weight based on the overall weight of the monomers, in the initial charge and to meter in the remainder. The feeds may be carried out separately (spatially and temporally) or some or all of the components to be metered may first be emulsified prior to metering in.

Depending on their chemical nature, the auxiliary monomers may likewise all be included in the initial charge or metered in. Partial inclusion in the initial charge and partial metering, are also possible. The auxiliary monomers are preferably metered in or included in the initial charge as a function of their copolymerization parameters. The monomer conversion is controlled with the initiator feed. The initiators are preferably metered in entirely.

Essential to the invention is the use of a seed latex. The seed latex is used in an amount of from 2 to 15% by weight (solids fraction s/s), based on the amount of vinyl ester used. Also essential to the invention is that the seed latex is not included entirely in the initial charge but instead is in part metered in. It is preferred to include from 30 to 75% by weight of the total amount of seed latex in the initial charge. The remaining 25 to 70% by weight are supplied in the course of the polymerization.

As the seed dispersion it is possible to use all customary, polyvinyl alcohol-compatible homopolymers or copolymers of ethylenically unsaturated monomers, in the form of aqueous dispersions, irrespective of the monomer composition and stabilization. Preference is given to aqueous dispersions of vinyl acetate homopolymers and copolymers, especially vinyl acetate-ethylene copolymers, that are stabilized with polyvinyl alcohol. Examples thereof are vinyl acetate polymers and vinyl acetate-ethylene copolymers with an ethylene fraction ranging from 1 to 40%, which may, if desired, also include further comonomers from the group consisting of vinyl esters, (meth)acrylic esters, vinyl chloride, and also the auxiliary monomers referred to earlier above, in each case preferably in the abovementioned amounts. The preferred particle size of the seed dispersion is from 200 to 2000 nm, with particular preference from 500 to 1500 nm, (in each case expressed as weight average particle size, Dw. The solids content is preferably from 50 to 65%, with particular preference given to the range from 55 to 60%. The viscosity of the seed dispersion is preferably less than 3000 mPa·s (Brookfield, 20 $s^{-1}$)

After the end of the polymerization, the batch may be postpolymerized using known methods in order to remove residual monomers, by means, for example, of a postpolymerization initiated with redox catalysts. Volatile residual monomers may also be removed by means of distillation, preferably under reduced pressure, and, if desired, assisted by the passage of inert entraining gases such as air, nitrogen or steam, through or over the batch.

The aqueous dispersions obtainable by the process of the invention have a solids content of greater than 60% by weight, more preferably greater than 65% by weight, and most preferably greater than 70% by weight. The viscosity of the dispersions of the invention is preferably less than 10,000 mPa·s, more preferably less than 5000 mPa·s. Preferred dispersions are those with low thixotropy, that is to say a low dependency of viscosity with shear stress.

The aqueous dispersions obtainable by the process of the invention can be used, if desired, to prepare water-redispersible polymer powders. For this purpose the aqueous dispersions, optionally following the addition of protective colloids as a spraying aid, are dried. Drying may be accomplished, for example, by fluidized bed drying, freeze drying or spray drying. Preferably, the dispersions are spray dried.

The aqueous polymer dispersions and the powders obtainable therefrom may be employed in all fields of application typical for these products. Examples include chemical products for the construction industry, for example, alone or in conjunction with hydraulically setting binders such as cements (Portland, aluminate, pozzolanic, slag, magnesia, and phosphate cements), gypsum and water glass, for the production of building adhesives, especially tile adhesives and exterior insulation adhesives; and for plasters and renders, filling compounds, trowel-applied flooring compounds, leveling compounds, grouts, jointing mortars, and paints, as well as binders for coating compositions and adhesives generally, or as coating and binding materials for textiles and paper or wood.

The examples which follow serve to illustrate the invention:

The seed dispersion used in the examples was an aqueous dispersion of a copolymer containing 85% by weight vinyl acetate and 15% by weight ethylene. The dispersion was stabilized by means of 8% by weight, based on the copolymer weight, of a polyvinyl alcohol having a degree of hydrolysis of 88 mol % and a Höppler viscosity of 4 mPa·s. The dispersion had a solids content of 55%, a Brookfield viscosity ($20\ s^{-1}$) of 600 mPa·s, and an average particle size (weight average Dw) of 900 mn.

EXAMPLE 1

A 600 liter autoclave was charged with 61 kg of deionized water, 23 kg of a 20% strength solution of a polyvinyl alcohol having a degree of hydrolysis of 88 mol % and a Höppler viscosity of 4 mPa·s, 22.5 kg of the previously described seed dispersion, and 112 kg of vinyl acetate. The pH was adjusted to 4.0 using formic acid and the autoclave was evacuated. Subsequently, at 75° C., 28 bar of ethylene were injected, which corresponded to an ethylene quantity of 20 kg. To start the polymerization, the initiator feeds, a 3% strength aqueous solution of tert-butyl hydroperoxide, and a 5% strength aqueous solution of ascorbic acid, were metered in, each at 1200 g/h. The internal temperature was limited to 75° C. by external cooling. 5 minutes after the beginning of the reaction, the vinyl acetate feeds, consisting of vinyl acetate, and a pre-emulsion consisting of 24 kg of water, 46 kg of a 20% strength solution of a polyvinyl alcohol having a degree of hydrolysis of 88 mol % and a Höppler viscosity of 4 mPa·s, and 14 kg of seed latex, was begun. 225 kg of vinyl acetate were metered in at a rate of 90 kg/h; 84 kg of pre-emulsion were metered in at a rate of 33.5 kg/h. Ethylene was continually added up to a quantity of 40 kg at 44 bar. After the end of the reaction, the autoclave was cooled, excess ethylene was released, and the polymer was postpolymerized in order to remove residual monomer. For the postpolymerization, 1100 g of a 10% strength aqueous solution of tert-butyl hydroperoxide, and 2200 g of a 5% strength aqueous solution of ascorbic acid, were added in succession. Subsequently, the dispersion was discharged through a 500 µm sieve. The product had a dispersion the following characteristics:

| | |
|---|---|
| Solids content ("SC"): | 71.5% |
| BF 20 Viscosity (Brookfield, $20\ s^{-1}$): | 6500 mPa · s |
| pH: | 4.2 |
| Particle size, Dw (weight means): | 2390 nm |
| Particle size, Dn (number means): | 120 nm |
| Filter residue ("SR") (70 µm): | 520 ppm |
| Sediment ("SB"): | 0.1/0.8 |

EXAMPLE 2

A dispersion was prepared following the procedure of example 1, except that 15 kg of the seed dispersion were included with the initial charge and 21.5 kg were metered in. Analytical data are given in Table 1.

EXAMPLE 3

A dispersion was prepared following the procedure of example 1, except that 25.5 kg of the seed dispersion were included with the initial charge and 11 kg were metered in. Analytical data are given in Table 1.

EXAMPLE 4

Comparative

A dispersion was prepared following the procedure of example 1, except that 30 kg of the seed dispersion were included with the initial charge and 6.5 kg were metered in. Analytical data are given in Table 1.

EXAMPLE 5

Comparative

A dispersion was prepared following the procedure of example 1, except that the entire seed dispersion (36.5 kg) was included in the initial charge. Anayltical data are given in Table 1.

EXAMPLE 6

A dispersion was prepared following the procedure of example 1, except that 28 kg of the seed dispersion were included in the initial charge and 18 kg were metered in with only 55 kg of water being used in the initial charge. Analytical data are given in Table 1.

EXAMPLE 7

A dispersion was prepared following the procedure of example 1, except that 37 kg of the seed dispersion were included in the initial charge and 24 kg were metered in, with only 50 kg of water being used in the initial charge. Anayltical data are given in Table 1.

EXAMPLE 8

A dispersion was prepared following the procedure of example 1, except that a 20% strength solution of a polyvinyl alcohol having a degree of hydrolysis of 88 mol % and a Höppler viscosity of 3.5 mPa·s was used as the polyvinyl alcohol. Analytical data are given in Table 1.

EXAMPLE 9

A dispersion was prepared following the procedure of example 1, except that a mixture of 75 parts by weight of a 20% strength solution of a polyvinyl alcohol having a degree of hydrolysis of 88 mol % and a Höppler viscosity of 3.5 mPa·s and 25 parts by weight of a 20% strength solution of a polyvinyl alcohol having a degree of hydrolysis of 88 mol % and a Höppler viscosity of 4 mPa·s was used as the polyvinyl alcohol. Analytical data are given in Table 1.

EXAMPLE 10

A dispersion was prepared following the procedure of example 1, except that a 20% strength solution of a polyvinyl alcohol having a degree of hydrolysis of 88 mol % and a Höppler viscosity of 2.5 mPa·s was used as the polyvinyl alcohol. Analytical data are given in Table 1.

Powder Preparation

The dispersions from examples 1 to 3 and 6 to 9 were admixed with 10% by weight (solids/solids) of polyvinyl alcohol having a degree of hydrolysis of 88 mol % and a Höppler viscosity of 4 mPa·s and diluted with water to a spray viscosity of 250 mPa·s. The dispersion was then sprayed using a two-fluid nozzle. The spraying component used was air precompressed to 4 bar, and the droplets formed were dried concurrently with air heated to 125° C. The dry powder obtained was admixed with 10% by weight of commercially customary antiblocking agent consisting of a mixture of calcium magnesium carbonate and magnesium hydrosilicate.

Determination of the Sieve Residue ("SR")

The sieve residue of the dispersions was determined by sieving through a sieve with a mesh size of 70 μm. The result is reported in mg of residue per kg of dispersion used (mg/kg=ppm).

Determination of the Settling Behavior ("SB")

The settling behavior was determined using dilute dispersions (0.5% solids content), by introducing 100 ml of this dispersion into a graduated tube and measuring the settled height of solids. The result is reported in mm sediment after one hour and after 24 hours.

Determination of the Redispersion Behavior ("R")

0.2 mm thick films of the spraying dispersions of the above examples, including the spray drying protective colloid were prepared by coating onto glass plates followed by drying at 105° C. for 15 minutes. To examine the film redispersibility, one drop of water was applied at room temperature to a homogeneous site of the test film using a pipette, and after allowing the water to act for 60 seconds, the water drop was rubbed at the same site using the fingertip until the glass plate at this site was film-free, the film fragmented, or the film retained its integrity completely. The redispersibility of the polymer films was assessed using the following evaluation scheme:

Rating 1: The film can be redispersed immediately by slight rubbing or redisperses automatically;
Rating 2: The film can be redispersed by rubbing, although film fragments of low redispersibility are possible;
Rating 3: The film can be redispersed only by vigorous rubbing, and film fragments are formed;
Rating 4: The film cannot be redispersed even by prolonged vigorous rubbing, but instead fragments.

Determination of the Blocking Resistance ("B")

To determine the blocking resistance, the dispersion powder was placed in an iron tube with a thread and then subjected to the load of a metal ram. Loading was followed by storage at 50° C. for 16 hours in a drying cabinet. After cooling to room temperature, the powder was removed from the tube and the blocking stability was determined qualitatively by crushing the powder. The blocking stability was classified as follows:

1=very good blocking stability
2=good blocking stability
3=satisfactory blocking stability
4=not stable to blocking, powder after crushing is no longer free-flowing.

Determination of the Cement Stability ("CS")

A cement mixture was prepared by stirring to the following formulation:

| | |
|---|---|
| Portland cement | 82.5 g |
| Calcite (CaCO$_3$) 10–40 mm | 75 g |
| Quartz sand 200–500 mm | 142 g |
| Dispersion powder | 14.5 g |
| Water | 85 g |

The processability of this mixture was observed over a period of 2 hours and assessed qualitatively. The test results are summarized in Table 1.

The products of the invention show low viscosities with good stability. The comparative examples show definitely higher viscosities and/or undesirable stability. Therefore no powder was prepared from the comparative examples. The procedure of the invention leads in every case to readily redispersible and cement-stable dispersions or powders, respectively; the powders exhibit good blocking stabilities and thus good stabilities on storage.

TABLE 1

| Example | SC[1] (%) | pH | BF20[2] (mPa·s) | Dw[3] (nm) | Dn[4] (nm) | SR[5] (ppm) | SB[6] (mm) | R[9] | B[8] | CS[9] |
|---|---|---|---|---|---|---|---|---|---|---|
| 1 | 71.5 | 4.2 | 6500 | 2390 | 120 | 520 | 0.1/0.8 | 1 | 1 | yes |
| 2 | 70.6 | 4.1 | 4600 | 2400 | 130 | 460 | 0.1/0.7 | 1 | 1 | yes |
| 3 | 71.1 | 4.3 | 4900 | 2200 | 140 | 420 | 0.0/0.5 | 1 | 1 | yes |
| 4 (Comp.) | 70.4 | 4.1 | 10600 | 2600 | 1800 | 590 | 0.2/1.4 | | | |
| 5 (Comp.) | 68.5 | 4 | 15800 | 3200 | 2200 | 660 | 0.3/1.8 | | | |
| Ex. 6 | 69.6 | 4.2 | 3500 | 2300 | 135 | 530 | 0.1/0.8 | 1 | 1 | yes |
| Ex. 7 | 70.2 | 4.1 | 2900 | 2100 | 155 | 480 | 0.1/0.9 | 1 | 1 | yes |
| Ex. 8 | 71.8 | 4.3 | 4500 | 2250 | 140 | 500 | 0.1/0.8 | 1 | 1 | yes |
| Ex. 9 | 70.7 | 4.1 | 4800 | 2400 | 130 | 450 | 0.0/0.7 | 1 | 1 | yes |
| Ex. 10 | 68.5 | 4.1 | 3900* | 5400 | 120 | 890 | 0.3/1.5 | | | |

TABLE 1-continued

| Example | SC[1] (%) | pH | BF20[2] (mPa · s) | Dw[3] (nm) | Dn[4] (nm) | SR[5] (ppm) | SB[6] (mm) | R[9] | B[8] | CS[9] |
|---|---|---|---|---|---|---|---|---|---|---|

*dilatant
[1]Solids Content
[2]Brookfield viscosity, 20s$^{-1}$, mPa · s
[3]Particle size, weight distribution
[4]Particle size, number distribution
[5]Sieve residue
[6]Settling behavior, mm sediment after 1 and 24 hours
[7]Redispersibility
[8]Blocking resistance
[9]Cement stability While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated otherwise.

What is claimed is:

1. A process for preparing copolymers based on vinyl ester and ethylene comonomers and optionally further comonomers, in the form of their aqueous dispersions, said aqueous dispersions having a solids content of greater than 65% and a Brookfield viscosity of less than 10,000 mPa·s, said process comprising:
  polymerizing one or more vinyl ester monomers and ethylene, and optionally further monomers copolymerizable therewith, in the presence of one or more protective colloids, said polymerizing conducted in the presence of a seed latex;
  wherein said polymerizing takes place without adding emulsifier, and in the presence of at least one polyvinyl alcohol protective colloid, said polyvinyl alcohol having a degree of hydrolysis of from 80 to 95 mol % and a Höppler viscosity in 4% by weight aqueous solution of from 3 to 30 mPa·s, and
  wherein from 30 to 75% of the total weight of the seed latex is introduced before beginning polymerizing and the remainder of said seed latex is metered in during polymerizing, the seed latex having a weight average particle size $D_w$ of from 200 to 2000 nm, the total amount of said seed latex being from 2 weight percent to 15 weight percent based on the total weight of vinyl ester monomer(s).

2. The process of claim 1, comprising polymerizing one or more vinyl esters of carboxylic acids having 1 to 12 carbon atoms in an amount of from 30 to 90% by weight and ethylene in an amount of from 1 to 40% by weight, and optionally copolymerizing one or more (meth)acrylic acid esters, vinyl halogenides or non-ethylene olefin comonomers the percents by weight, based in each case on the total weight of all monomers and totaling 100%.

3. The process of claim 1, wherein the comonomer mixtures comprise
  comonomer mixtures of vinyl acetate with from 1 to 40% by weight of ethylene;
  comonomer mixtures of vinyl acetate with from 1 to 40% by weight of ethylene and from 1 to 50% by weight of one or more further non-vinyl acetate vinyl ester comonomers having 1 to 12 carbon atoms in the carboxylic acid radical;
  comonomer mixtures of vinyl acetate, from 1 to 40% by weight of ethylene and from 1 to 60% by weight of acrylic esters of branched or unbranched alcohols having from 1 to 15 carbon atoms;
  comonomer mixtures of from 30 to 75% by weight of vinyl acetate, from 1 to 30% by weight of vinyl laurate or vinyl esters of an α-branched carboxylic acid having 9 to 11 carbon atoms, unbranched alcohols having 1 to 15 carbon atoms, and from 1 to 40% by weight of ethylene;
  comonomer mixtures of vinyl acetate, from 1 to 40% by weight of ethylene and from 1 to 30% by weight of vinyl chloride;
said mixtures optionally containing auxiliary comonomers, the amounts in % by weight adding up to 100% by weight in each case when all comonomers are considered.

4. The process of claim 1, wherein one or more partially saponified polyvinyl alcohols having a degree of hydrolysis of from 85 to 94 mol % and a Höppler viscosity in a 4% by weight aqueous solution of from 3 to 15 mPa·s are used as protective colloids.

5. The process of claim 1, wherein polyvinyl alcohol-stabilized aqueous dispersions of vinyl acetate homopolymers and copolymers are used as a seed latex.

6. The process of claim 1, further comprising spray drying said aqueous dispersion, with or without the addition of further protective colloids as spraying aids, and recovering a water-redispersible polymer powder.

7. A building material comprising an aqueous dispersion prepared by the process of claim 1 and/or a redispersible polymer powder prepared therefrom, alone or in conjunction with inorganic, hydraulically setting binders, wherein said building material comprises a building adhesive, plaster, render, filling compound, trowel-applied flooring compound, leveling compound, grout, jointing mortar, or paint.

8. A coating composition, paint, or adhesive comprising, as a further ingredient thereof, an aqueous polymer dispersion prepared by the process of claim 1 or a redispersible powder prepared therefrom.

9. A coating and/or and binding material for textiles or paper comprising, as at least one further ingredient thereof, an aqueous polymer dispersion prepared by the process of claim 1 or a redispersible powder prepared therefrom.

10. A tile adhesive or adhesive for exterior insulation systems comprising, as at least one further ingredient thereof, an aqueous polymer dispersion prepared by the process of claim 1 or a redispersible powder prepared therefrom.

* * * * *

UNITED STATES PATENT AND TRADEMARK OFFICE
CERTIFICATE OF CORRECTION

PATENT NO. : 6,632,869 B2
DATED : October 14, 2003
INVENTOR(S) : Hans-Peter Weitzel Page 1 of 1

It is certified that error appears in the above-identified patent and that said Letters Patent is hereby corrected as shown below:

Column 12,
Line 23, after "9 to 11 carbon atoms," and before "unbranched alcohols ..." please insert therefor -- from 1 to 30% by weight of acrylic esters of branched or --.

Signed and Sealed this

Ninth Day of March, 2004

JON W. DUDAS
*Acting Director of the United States Patent and Trademark Office*